(12) United States Patent
Lentz

(10) Patent No.: US 6,325,837 B1
(45) Date of Patent: Dec. 4, 2001

(54) METHOD OF APPLICATION OF ORGANIC FERTILIZER

(76) Inventor: Samuel Friedrich Lentz, 4106 - 46 Street, Leduc, Alberta (CA), T9E 4Z2

( * ) Notice: Subject to any disclaimer, the term of this patent is extended or adjusted under 35 U.S.C. 154(b) by 0 days.

(21) Appl. No.: 09/503,619

(22) Filed: Feb. 11, 2000

(30) Foreign Application Priority Data

Apr. 9, 1999  (CA) .................................................. 2268441

(51) Int. Cl.⁷ ..................................................... C05F 11/00
(52) U.S. Cl. ................................... 71/23; 71/24; 71/64.13
(58) Field of Search ................................ 71/23, 64.13, 24

(56) References Cited

U.S. PATENT DOCUMENTS

| | | | |
|---|---|---|---|
| 3,502,458 | * 3/1970 | Schenk | 71/64 |
| 3,645,714 | 2/1972 | Heming et al. | 71/23 |
| 3,852,492 | * 12/1974 | Brown, Jr. et al. | 426/364 |
| 3,929,446 | * 12/1975 | Trocino | 71/23 |
| 5,252,542 | * 10/1993 | Allan | 504/323 |
| 5,624,612 | * 4/1997 | Sewall et al. | 264/4.1 |

OTHER PUBLICATIONS

"Grant & Hackh's Chemical Dictionary", editors: Grant et al. McGraw–Hill Book Co., p. 22, 1987.*
"American Heritage Dictionary", Houghton–Mifflin Co., Boston, p. 92, 1976.*
"Webster's Universal Unabridged Dictionary", Barnes and Noble Books, p. 36, 1989.*

* cited by examiner

*Primary Examiner*—Chhaya D. Sayala
(74) *Attorney, Agent, or Firm*—Christensen O'Connor Johnson Kindness PLLC

(57) ABSTRACT

A method of application of organic fertilizer. In accordance with the teachings of this method plant matter is dehydrated and pelletized to form fertilizer pellets. The fertilizer pellets are then spread on soil. When the fertilizer pellets are hydrated, the fertilizer pellets release nutrients into the soil. This form of organic fertilizer is easy to handle and has a higher concentration of nutrients than other fertilizers made from plant matter.

6 Claims, 1 Drawing Sheet

METHOD OF APPLICATION OF ORGANIC FERTILIZER

FIELD OF THE INVENTION

The present invention relates to an organic fertilizer and a method of application of the same.

BACKGROUND OF THE INVENTION

Care is required in handling and applying chemical fertilizers in order to avoid environmental damage, poisoning of wildlife and chemical induced illness to agricultural workers. There are well documented instances in which the requisite care was not exercised, with disastrous results. As a result, there is a movement toward organic fertilizers.

Two common forms of organic fertilizer are manure and plant matter compost. Both are difficult to handle. A further inherent disadvantage with manure is that it tends to be host to weed seeds.

SUMMARY OF THE INVENTION

What is required is an alternative form of organic fertilizer and a convenient method of applying the same.

According to the present invention there is provided a method of application of organic fertilizer. In accordance with the teachings of this method plant matter is dehydrated and pelletized to form fertilizer pellets. The fertilizer pellets are then spread on soil. When the fertilizer pellets are hydrated, the fertilizer pellets release nutrients into the soil.

The method of application of organic fertilizer, as described above, has numerous advantages. Pelletized plant matter is easy to handle. The pellets are not hazardous to wildlife; wildlife can eat them and not be harmed. The pellets will not "burn" or in any way harm the soil, even if applied excessively. When water is added the pellets expand and fall apart. As will hereinafter be documented, the pellets contain a concentration of nutrients, in greater quantities than plant matter compost.

Although beneficial results may be obtained through the use of the invention, as described above, even more beneficial results may be obtained when the plant matter is blended, either before or after dehydration and pelletization, to provide a blend of plant matter that has nutrients particularly suited for a desired application.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
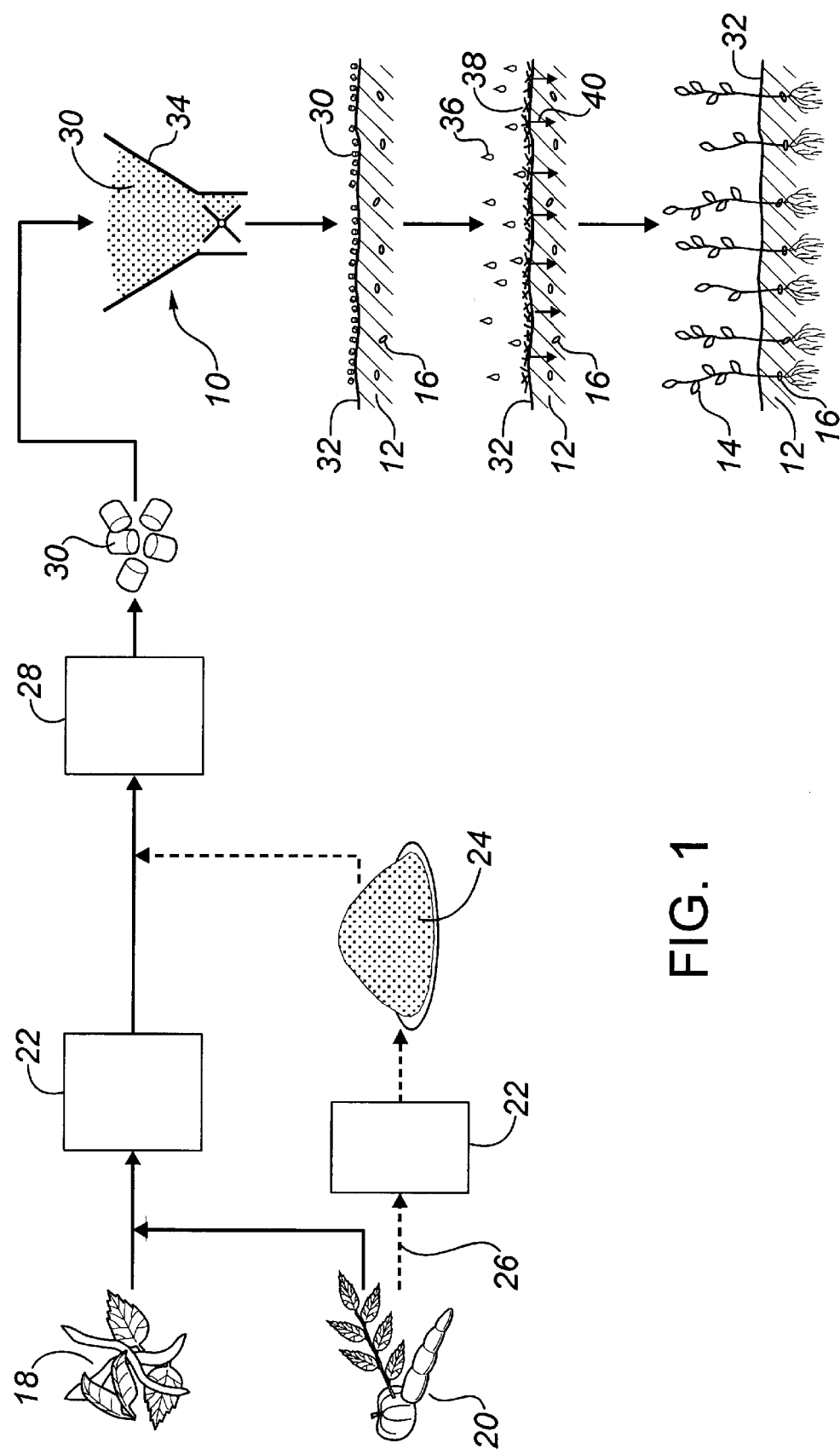
FIG. 1 is a flow diagram of a method of application of organic fertilizer in accordance with the teachings of the present invention.

The preferred embodiment, a method of application of organic fertilizer generally identified by reference numeral 10, will now be described with reference to FIG. 1.

Referring to FIG. 1, method of application of organic fertilizer includes the steps of preparing said fertilizer 10 and applying said fertilizer 10 to a soil 12 to provide nutrients for the growth of vegetation 14 from seeds 16.

Fertilizer 10 is prepared from a first plant matter 18. A composition of fertilizer 10 is adjustable by blending first plant matter 18 with a second plant matter 20, to provide a desired mix of nutrients. In a first embodiment of method of preparation of fertilizer 10, a blend of first plant matter 18 and second plant matter 20 is dehydrated in a dehydrator 22. In a second embodiment of method of preparation of fertilizer 10, indicated by dashed arrows in FIG. 1, first plant matter 18 is dehydrated in dehydrator 22 and blended with dehydrated matter 24 derived by separate dehydration of second plant matter 20 in a parallel process stream 26 to provide a desired mix of nutrients.

The blend of dehydrated first plant matter 18 and dehydrated second plant matter 20 so formed is fed to a pelletizer 28 in which it is formed into pellets 30.

Pellets 30 of fertilizer 10 are spread onto a surface 32 of soil 12 from one of several kinds of mechanical spreader 34. When rain or irrigation water 36 falls onto soil 12, pellets 30 are hydrated and disintegrate into a dissipated material 38, thereby releasing the nutrients in fertilizer 10. Nutrients released from dissipated material 38 by water 36 are carried by said water 36 into soil 12 as indicated by arrows 40, thereby providing the nutrients to seeds 16 and promoting the growth of plants 14 from seeds 16.

| PARAMETER | Alfalfa Compost (TIROL Sample) | "Agri-Boost" | Cattle Manure (Old College) |
|---|---|---|---|
| Total Nitrogen % | 1.36 | 2.81 | 1.22 |
| Total Phosphorus % | 0.223 | 0.43 | 0.59 |
| Total Potassium % | 2.02 | 2.67 | 1.64 |
| Calcium % | 4.49 | 1.43 | 2.47 |
| Magnesium % | 1.23 | 0.34 | 0.51 |
| Sodium % | 0.09 | 0.13 | 0.22 |
| Total Organic Matter % | 29.4 | 91.0 | 59.0 |
| Available Organic Matter % | 17.3 | — | 42.30 |
| Total Carbon % | 16.3 | 60.50 | 31.20 |
| Carbon/Nitrogen Ratio | 12.0 | 21.53 | 25.57 |
| Electrical Conductivity mS/cm | 36.6 | 46.61 | 37.97 |
| SAR | 0.98 | 2.6 | 3.4 |
| pH | 8.12 | 6.30 | 8.10 |
| Moisture Content % | 40.4 | 4.92 | 66.70 |
| Ash % | 70.6 | 9.03 | 41.00 |

An example of a composition of fertilizer 10 has been prepared under the trade name "Agri-Boost" and is shown in Table 1. The example of composition of fertilizer 10 is prepared by dehydration of a blend of alfalfa. A comparison of the composition of the example of fertilizer 10 with compositions of alfalfa compost and cattle manure is found in Table 1. The composition of fertilizer 10 is much higher in nutrients and much lower in moisture and ash than either first alfalfa compost or cattle manure. Further, fertilizer 10 has a pH value that is close to neutral or is very weakly acidic, whereas alfalfa compost and cattle manure each has a pH value that is weakly basic. The composition of fertilizer 10 is adjustable by altering the proportions of first plant matter 18 and second plant matter 20 from which fertilizer 10 is prepared as described above.

The fertilizer, as described above, has been found to be particularly useful in reconditioning soil. This is alternatively referred to as soil amendment, soil restoration, or soil refurbishing. It is necessary where there has been an overuse of chemical fertilizers or where other factors have caused a ph imbalance. When the pellets are exposed to moisture, such as through rainfall, they expand to form a ground cover. This ground cover retards the rate at which the sun draws moisture from the soil. When intermixed with the soil, the ground cover serves as a compost and adds fibre to the soil. The pellets, as described above, are much easier to handle than any other natural alternatives. They pose no danger to wildlife. Wildlife can eat the pellets with no harmful side effects.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A Method of Application of Organic Fertilizer prepared from a forage plant, comprising the steps of:

dehydrating the forage plant;

pelletizing the dehydrated forage plant to form fertilizer pellets; and spreading the fertilizer pellets on soil, such that when the fertilizer pellets are hydrated said fertilizer pellets release nutrients into the soil.

2. A Method of Application of Organic Fertilizer prepared from a forage plant, comprising the steps of:

dehydrating the forage plant;

pelletizing the dehydrated forage plant to form fertilizer pellets;

blending fertilizer pellets made from differing types of forage plants to form a blend of fertilizer pellets with a desired mix of nutrients; and spreading the fertilizer pellets on soil, such that when the fertilizer pellets are hydrated said fertilizer pellets release nutrients into the soil.

3. A Method of Application of Organic Fertilizer prepared from a forage plant, comprising the steps of:

blending differing types of forage plants to obtain a desired mix of nutrients;

dehydrating the forage plants;

pelletizing the dehydrated forage plants to form fertilizer pellets; and spreading the fertilizer pellets on soil, such that when the fertilizer pellets are hydrated said fertilizer pellets release nutrients into the soil.

4. The Method of claim 1, wherein the forage plant is alfalfa.

5. The Method of claim 2, wherein the forage plant is alfalfa.

6. The Method of claim 3, wherein the forage plant is alfalfa.

* * * * *

UNITED STATES PATENT AND TRADEMARK OFFICE
CERTIFICATE OF CORRECTION

PATENT NO.    : 6,325,837 B1
DATED         : December 4, 2001
INVENTOR(S)   : S.F. Lentz Page 1 of 1

It is certified that error appears in the above-identified patent and that said Letters Patent is hereby corrected as shown below:

<u>Column 3,</u>
Line 11 "ciaimed" should read -- claimed --

Signed and Sealed this

Seventh Day of May, 2002

Attest:

Attesting Officer

JAMES E. ROGAN
*Director of the United States Patent and Trademark Office*